(12) United States Patent
Sato

(10) Patent No.: US 7,743,027 B2
(45) Date of Patent: Jun. 22, 2010

(54) INTERACTION INFORMATION PROCESSING APPARATUS AND INTERACTION INFORMATION PROCESSING METHOD

(75) Inventor: Yasushi Sato, Kitakyushu (JP)

(73) Assignee: Kyushu Institute of Technology, Kitakyushu-shi (JP)

( * ) Notice: Subject to any disclaimer, the term of this patent is extended or adjusted under 35 U.S.C. 154(b) by 339 days.

(21) Appl. No.: 11/886,916

(22) PCT Filed: Mar. 23, 2006

(86) PCT No.: PCT/JP2006/305815

§ 371 (c)(1),
(2), (4) Date: Sep. 21, 2007

(87) PCT Pub. No.: WO2006/101164

PCT Pub. Date: Sep. 28, 2006

(65) Prior Publication Data

US 2009/0013000 A1      Jan. 8, 2009

(30) Foreign Application Priority Data

Mar. 23, 2005   (JP)   ............................. 2005-084287

(51) Int. Cl.
*G06F 17/30* (2006.01)

(52) U.S. Cl. ........................ 707/640; 707/674; 715/202; 717/116

(58) Field of Classification Search ................... 707/10, 707/102, 204, 3, 104.1, 640, 674; 715/854, 715/202, 205, 839; 705/39; 717/116
See application file for complete search history.

(56) References Cited

U.S. PATENT DOCUMENTS

| | | | | |
|---|---|---|---|---|
| 5,428,736 A | * | 6/1995 | Kahl et al. | 715/839 |
| 5,659,794 A | * | 8/1997 | Caldarale et al. | 710/1 |
| 5,950,190 A | * | 9/1999 | Yeager et al. | 707/3 |
| 6,014,647 A | * | 1/2000 | Nizzari et al. | 705/39 |

(Continued)

FOREIGN PATENT DOCUMENTS

JP           63-317805           12/1988

(Continued)

*Primary Examiner*—Shahid A Alam
(74) *Attorney, Agent, or Firm*—Edwards Angell Palmer & Dodge LLP

(57) ABSTRACT

To provide an interaction information processing apparatus capable of easily performing addition and deletion of a scenario, and of suitably executing processing contents, even when a plurality of events are simultaneously input. The interaction information processing apparatus includes: a net status table 10 which stores a net status of each net; a processing item table 12 which stores groups of {a processing item, an input net of the processing item, and an output net of the processing item}; processing item execution modules 4-*i* each of which is provided in correspondence with each processing item, executes processing contents of the processing item, and updates a net status of the output net according to the execution result; selection execution means 13 which successively selects all the processing items in the processing item table 12, and executes the processing item execution module 4-*i* corresponding to the selected processing item; and status change determination means 14 which, when one of the net statuses in the net status table 12 is changed, makes the selection execution means 13 execute the each processing item execution module 4-*i*.

11 Claims, 7 Drawing Sheets

U.S. PATENT DOCUMENTS

| | | | |
|---|---|---|---|
| 6,081,814 A * | 6/2000 | Mangat et al. | 715/205 |
| 6,518,989 B1 * | 2/2003 | Ishikawa | 715/848 |
| 6,714,223 B2 * | 3/2004 | Asami et al. | 715/854 |
| 6,954,894 B1 * | 10/2005 | Balnaves et al. | 715/202 |
| 2001/0032274 A1 | 10/2001 | Asami et al. | |
| 2002/0165724 A1 * | 11/2002 | Blankesteijn | 705/1 |
| 2004/0148589 A1 * | 7/2004 | Conrad et al. | 717/116 |

FOREIGN PATENT DOCUMENTS

| | | |
|---|---|---|
| JP | 11-234753 | 8/1999 |
| JP | 2001-056694 | 2/2001 |
| JP | 2001-296943 | 10/2001 |

* cited by examiner

FIG. 3

(input side)

| processing item | input net | output net | corpus |
|---|---|---|---|
| FCT1 | | 1 | turn on the air conditioner |
| FCT2 | | 2 | air conditioner |
| FCT3 | | 3 | turn off the air conditioner |
| FCT4 | | 4 | close |
| FCT5 | | 5 | open |
| FCT6 | | 6 | what's the temperature |
| FCT7 | | 7 | turn down |
| FCT8 | | 8 | hot |
| STS1 | | 9 | |
| STS2 | | 10 | |
| END4 | 57 | | |
| END5 | 58 | | |
| END6 | 59 | | |
| END7 | 60 | | |
| END11 | 61 | | |
| END12 | 62 | | |

(output side)

| processing item | input net | output net | corpus |
|---|---|---|---|
| END9 | 63 | | |
| END10 | 64 | | |
| END1 | 65 | | |
| END2 | 66 | | |
| END8 | 67 | | |
| END3 | 68 | | |

(net)

| processing item | input net | output net | corpus |
|---|---|---|---|
| TTS1 | 19 | 6 | |
| TTS2 | 65 | 8 | |
| TTS3 | 66 | 33 | |
| TTS4 | 30 | 29 | |
| TTS5 | 68 | 28 | |
| TTS6 | 35 | 34 | |
| TTS7 | 57 | 15 | |
| TTS8 | 58 | 18 | |
| TTS9 | 59 | 4 | |
| TTS10 | 60 | 25 | |
| TTS11 | 43 | 26 | |
| TTS12 | 40 | 39 | |
| TTS13 | 67 | 41 | |
| TTS14 | 44 | 42 | |
| TTS15 | 51 | 43 | |
| TTS16 | 56 | 55 | |
| TTS17 | 63 | 49 | |
| TTS18 | 47 | 46 | |
| TTS19 | 64 | 50 | |
| QB1 | 20 | 27,31,29 | window, air conditioner |
| QB2 | 36 | 41,38,39 | window, air conditioner |
| QB3 | 45 | 48,49,46 | yes, no |
| QB4 | 52 | 53,54,55 | yes, no |
| BR1 | 2 | 16, 17 | |
| BR2 | 27 | 28, 37 | |
| BR3 | 7 | 32, 42 | |
| BR4 | 32 | 33, 34 | |
| BR5 | 22 | 25, 26 | |
| JA1 | 19, 30 | 20 | |
| JA2 | 1, 16 | 16 | |
| JA3 | 3, 17 | 18 | |
| JA4 | 5, 24 | 22 | |
| JA5 | 31, 38 | 24 | |
| JA6 | 35, 40 | 36 | |
| JA7 | 44, 47 | 45 | |
| JA8 | 51, 56 | 52 | |
| JA9 | 37, 48 | 50 | |

FIG. 4

Net status table

| NET | net status | change flag |
|---|---|---|
| NET1 | 0 | 0 |
| NET2 | 0 | 0 |
| NET3 | 0 | 0 |
| NET4 | 0 | 0 |
| NET5 | 0 | 0 |
| NET6 | 0 | 0 |
| NET7 | 0 | 0 |
| NET8 | 0 | 0 |
| NET9 | 0 | 0 |
| NET10 | 0 | 0 |
| NET11 | 0 | 0 |
| ⋮ | ⋮ | ⋮ |
| NET63 | 0 | 0 |
| NET64 | 0 | 0 |
| NET65 | 0 | 0 |
| NET66 | 0 | 0 |
| NET67 | 0 | 0 |
| NET68 | 0 | 0 |

Operation of the interaction recognition module

INTERACTION INFORMATION PROCESSING APPARATUS AND INTERACTION INFORMATION PROCESSING METHOD

TECHNICAL FIELD

The present invention relates to an interaction information processing technique by which information processing is performed while interacting with a user by using voice and the like.

BACKGROUND ART

In recent years, a car navigation apparatus and various domestic apparatuses which include an interactive user interface have been investigated and developed. In such interactive user interface, an apparatus which performs information processing of interaction with the user is referred to as an interaction information processing apparatus.

In the interaction information processing apparatus, information is acquired through interaction with the user, and processing based on the information is performed. For example, the processing is performed in such a manner that contents of the user's utterance is recognized by a voice recognition device, that a reply and a question are repeated by a voice synthesis device in correspondence with the recognized contents, and that the apparatus is operated according to the intention of the user. Note that "interaction" here includes not only interaction by voice but also interaction by a switch operation, interaction by an image, and the like.

The interaction information processing apparatus needs to perform natural interaction without giving a feeling of incongruity to the user. That is, it is important to increase the degree of freedom in utterance selection on the user's side.

Accordingly, there has been developed an interaction information processing apparatus in which an application program (execution module and hereinafter referred to as "AP") configured to operate various devices and a program (interaction module) configured to perform interactive processing are independently provided, and which performs interaction processing on the basis of scenarios prepared for the AP (see Patent Document 1 and Patent Document 2).

In the interaction information processing apparatus described in Patent Document 1, the interaction having a high degree of freedom on the user's side is realized in such a manner that the description of interaction processing itself is made independent of the AP, and the flow of interaction is prevented from being influenced by the processing procedure of the AP.

Further, in the interaction information processing apparatus described in Patent Document 2, there is described a technique by which the scenarios are organized into a hierarchical structure, and thereby a shift to a different AP can be naturally performed on the basis of user's utterance.

FIG. 7 is a figure showing a hierarchical structure of scenarios in the interaction information processing apparatus described in Patent Document 2. As the scenarios, there are prepared an A-AP scenario group, a B-AP scenario group, and a C-AP scenario group in correspondence with three APs. Also, a route scenario on the basis of which an application branching processing is performed is provided separately from the respective AP scenario groups. The application branching processing in the route scenario is to activate the AP in response to input information from the user, and to call the AP scenario group corresponding to the AP. Thus, in the case where while the processing in a certain AP scenario group is performed, the user instructs to shift the processing to the processing of the other AP scenario group, it is only necessary to shift the processing to the route scenario, and hence the shift to the different AP can be naturally performed.

Further, the application branching processing is made independent of the AP scenario groups, and is collected as the route scenario, whereby no matter how the number of APs is increased, the transition processing to the other AP scenario group needs not be described in each AP scenario group. As a result, it is possible to simplify the description of the AP scenario group.

Patent Document 1: Japanese Patent Laid-Open No. 2001-56694

Patent Document 2: Japanese Patent Laid-Open No. 2001-296943

However, in the above described conventional interaction information processing apparatus, when a new application is added, it is necessary to create an AP scenario group relating to the application, and to add the definition of application branching processing between the created AP scenario group and the other AP scenario groups to the route scenario. As a result, work for the addition and deletion of the scenario becomes complicated.

Further, when instructions are simultaneously input to a plurality of the APs by the user's utterance, the plurality of APs cannot be simultaneously controlled. That is, when, while certain processing of the AP scenario group (A) is executed, an instruction about the processing of the other AP scenario group (B) is input by the user, the interaction information processing apparatus is required to interrupt the processing of the AP scenario group (A), and to shift to the processing of AP scenario group (B). Then, when the utterance about the processing content of the AP scenario group (A) is input by the user, the interaction information processing apparatus interrupts the processing of the AP scenario group (B) and shifts to the processing of the AP scenario group (A). In this case, however, the processing of the AP scenario group (A) is performed from the beginning, and hence it is necessary for the user to repeatedly input the instruction contents previously input by the user. Therefore, there is a problem from the viewpoint of convenience for the user.

Accordingly, it is an object of the present invention to provide an interaction information processing technique by which addition and deletion of scenarios can be easily performed, and which, even when a plurality of events are simultaneously input by the user, makes it possible to simultaneously perform the processing contents corresponding to the input events in a suitable manner.

DISCLOSURE OF THE INVENTION

A first configuration of an interaction information processing apparatus according to the present invention, which interactively and suitably selects each processing item corresponding to an input event from a plurality of processing items prepared beforehand, and executes the selected processing item, is characterized by including: a net status table configured to store, as a table, variables (hereinafter referred to as "net statuses") representing status information, which variables are transmitted via each net for specifying an information transmission relation between the respective processing items; a processing item table configured to store, as a table, sets of the processing item, a net (hereinafter referred to as "input net") connected to the input side of the processing item and a net (hereinafter referred to as "output net") connected to the output side of the processing item; a plurality of processing item execution modules provided in correspondence with the respective processing items, and configured, to execute processing contents of the processing item, and to update the net status of the output net according to the result of the processing; selection execution means configured to successively select all the processing items in the processing item table and to read the net status of the input net of the selected processing item from the net status table, and configured to input the processing item, for which the net status of the input net is in the active state, into the processing item execution module corresponding to the processing item and to make the processing item execution module execute the processing contents of the processing item; and status change determination means configured, after one round of processing relating to the respective processing items is executed by the selection execution means, and the respective net statuses in the net status table are updated, to detect a change in the net status in the net status table, and configured, when one of the net statuses in the net status table is changed, to again make the selection execution means execute the processing relating to the respective processing items.

When an input event is input and one of the net statuses in the net status table is changed in correspondence with the input event, the status change determination means first detects the change in the net status, to make the selection execution means execute the respective processing item execution modules.

The selection execution means successively reads the processing items from the processing item table, and acquires the net status of the input net of the read processing item, from the net status table. Then, the selection execution means inputs the acquired net status into the processing item execution module corresponding to the processing item, and makes the processing item execution module execute the processing contents corresponding to the processing item.

When the net status of the input net of the processing item is in an active (assert) state, the each processing item execution module executes the processing relating to the processing item. Then, on the basis of the execution result, the each processing item execution module updates the net status of the output net in the net status table, as required. On the other hand, when the net status of the input net of the processing item is in an inactive (negate) state, the processing relating to the processing item is not executed.

When the execution of the processing item execution modules corresponding to all the processing items in the processing item table is completed by the selection execution means, the status change determination means again detects a change in the net statuses in the net status table. When a change in the net statuses is detected, the above described operation is repeated.

When a state (steady state) in which a change in the net statuses in the net status table is no longer detected by the status change determination means, is eventually reached, the interaction information processing is ended.

In this way, the net status corresponding to the input event is activated (asserted), and the execution of all the processing item execution modules is repeated in correspondence with the net status, until the net status in the net status table is stabilized, whereby even when a plurality of input events are simultaneously input, the processing items corresponding to the input events can be correctly executed.

Further, when a processing item is desired to be newly added, it is only necessary to add the processing item and the input/output nets in the processing item table, and to add, as required, a newly produced net in the net status table. Further, when a processing item is desired to be deleted, it is only necessary to add the processing item and the input/output nets in the processing item table, and to delete, as required, an unnecessary net from the net status table. Therefore, the processing item can be extremely easily added and deleted, which makes it possible to flexibly deal with a change in the processing item.

Here, the net status may assume a plurality of states. For example, the net status may assume two states of the active state and the inactive state, and may also assume more than two states.

A second configuration of the interaction information processing apparatus according to the present invention is characterized by including initial net status update means configured, when an input event is input in the first configuration, to update the net status of the net corresponding to the input event to the active state.

According to this configuration, the initial net status update means updates the net status of the net corresponding to the input event to the active state. This serves as a trigger, so that, as described above, the execution of all the processing item execution modules is repeated until the net status in the net status table is stabilized. Thereby, the processing items corresponding to the input event can be executed.

A third configuration of the interaction information processing apparatus according to the present invention is characterized in that in the second configuration, when a plurality of input events are simultaneously input, the initial net status update means updates the net status of the net corresponding to each of the input events, respectively.

According to this configuration, even when a plurality of input events are simultaneously input, it is possible to execute the processing items corresponding to the input events, respectively.

A fourth configuration of the interaction information processing apparatus according to the present invention is characterized in that an input device adapted to generate an input event according to an operation by the user is included in the second and third configurations, and in that the initial net status update means includes: a recognition dictionary configured to store correspondence relation between each input event and predetermined recognition information; an input event recognition means configured to refer to the recognition dictionary in correspondence with the input event and to output corresponding recognition information; and recognition information input means configured to update the net status of the net corresponding to the recognition information output by the input event recognition means, to a state specified by the recognition information.

According to this configuration, when an input event is output from the input device, the input event recognition means recognizes the input event, and outputs the recognition information. Then, according to the recognition information, the recognition information input means suitably updates the net status of the net to the state specified by the recognition information.

Here, as the input device, it is possible to use various input devices used for a computer, such as a voice input device, an image input device (a camera, a scanner and the like), a touch panel, a key input device, and a pointing device. As the input event, it is possible to list a voice signal, an image signal, a key input signal, and the like. As the recognition information, it is possible to list, for example, word information, ON/OFF information, and the like. Thereby, the processing items corresponding to the input event can be executed.

A program according to the present invention is characterized in that the program enables a computer to function as the interaction information processing apparatus having one of the above described first to fourth configurations by being incorporated in the computer.

An interaction information processing method according to the present invention suitably selects and executes each of a plurality of processing items prepared beforehand in correspondence with an input event, in a system including: a net status table which stores, as a table, variables (hereinafter referred to as "net statuses") representing status information, which variables are transmitted via each net for specifying a information transmission relation between the plurality of processing items; a processing item table which stores, as a table, sets of the processing item, a net (hereinafter referred to as "input net") connected to the input side of the processing item, and a net (hereinafter referred to as "output net") connected to the output side of the processing item; and a plurality of processing item execution modules which are provided in correspondence with the respective processing items, and which execute processing contents of the processing item corresponding to the net status of the input net, and update the net status of the output net according to the result of the processing. The interaction information processing method according to the present invention is characterized by including: an initial net state update step of, when an input event is input, updating the net status of the net corresponding to the input event among the respective nets in the net status table; and a processing item execution step of suitably selecting and executing the processing item execution module in correspondence with the input event; and characterized in that in the processing item execution step, a net state change detection step of detecting a change in one of the net statuses in the net status table; a selection execution step of, when a change in one of the net statuses in the net status table is detected, successively selecting all the processing items in the processing item table, reading the net status of the input net corresponding to the selected processing item from the net status table, inputting the read processing item, for which the net status of the input net is in the active state, into the processing item execution module corresponding to the processing item, and making the processing item execution module execute the processing contents of the processing item; and a net status change determination step of, after one round of processing relating to the respective processing items is executed and the respective net statuses in the net status table are updated in the selection execution step, detecting a chance in the net status in the net status table, and determining whether or not one of the net statuses in the net status table is changed, are repeatedly executed until a change in the above described net status is no longer detected.

As described above, according to the present invention, the net status corresponding to an input event is activated (asserted), and execution of all the processing item execution modules is repeated until the net status in the net status table is stabilized, so that even when a plurality of input events are simultaneously input, the processing items corresponding to the input events can be correctly executed.

Further, it is configured such that the respective processing items are executed and controlled by using the processing item table and the net status table, as a result of which it is possible to extremely easily add/delete the processing item, and to thereby flexibly cope with a change in the processing item.

BRIEF DESCRIPTION OF THE DRAWINGS

FIG. 3 is a figure showing a structure of a processing item table 12;

FIG. 4 is a figure showing a structure of a net status table 10;

BEST MODE FOR CARRYING OUT THE INVENTION

In the following, the best mode for carrying out the present invention will be described with reference to accompanying drawings.

Embodiment 1

Figure 1:
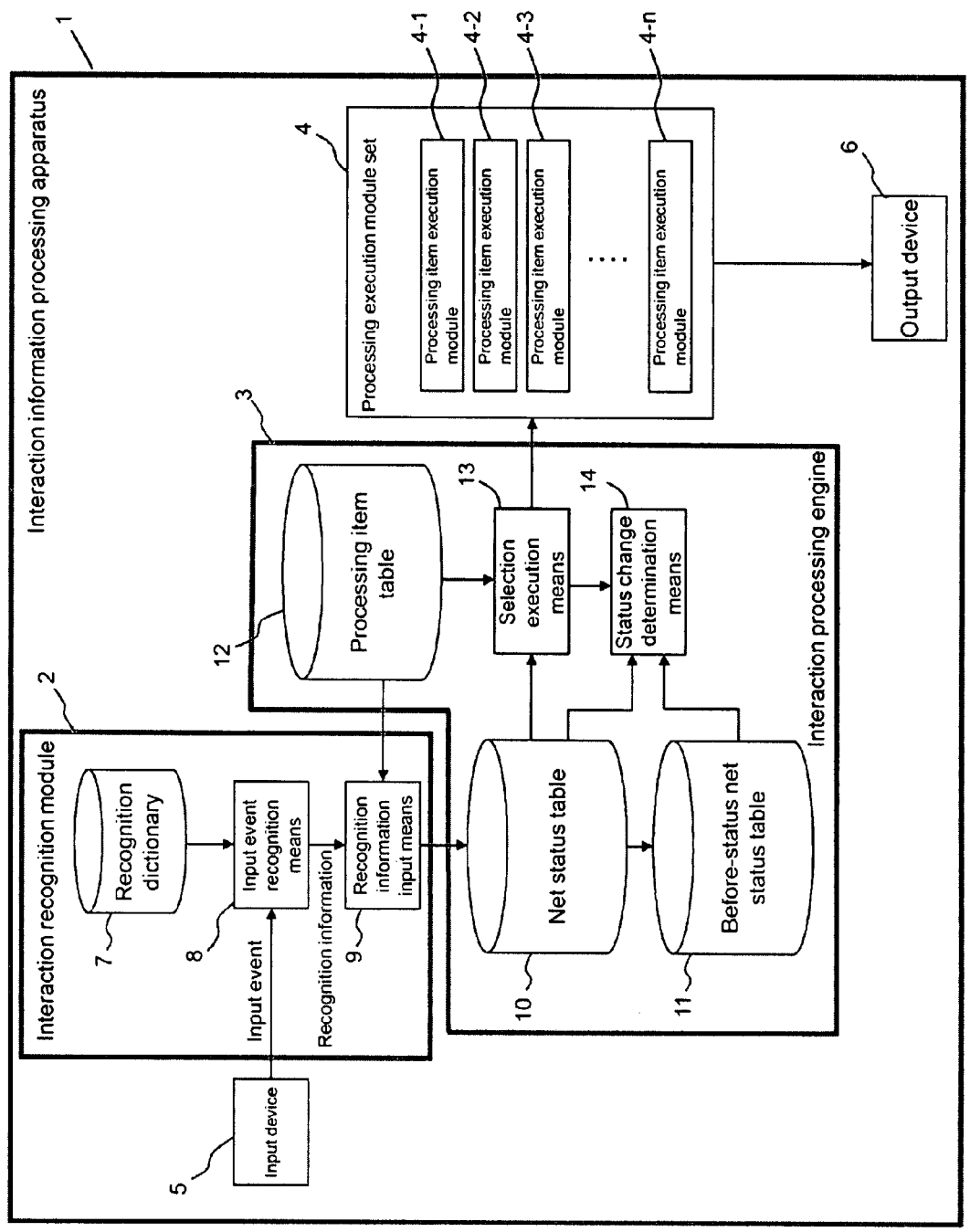
FIG. 1 is a block diagram showing a configuration of an interaction information processing apparatus 1 according to Embodiment 1 of the present invention.

FIG. 1 is a block diagram showing a configuration of interaction information processing apparatus 1 according to Embodiment 1 of the present invention. The interaction information processing apparatus 1 includes an interaction recognition module 2 as initial net status update means, an interaction processing engine 3, a processing execution module set 4, an input device 5, and an output device 6.

The input device 5 is a device which generates an input event by an operation of a user. In the present embodiment, it is assumed that a microphone is used as the input device 5.

The output device 6 is a device which actually executes various processings according to an instruction input by the user. For example, the output device 6 includes a loudspeaker which performs voice output processing, an air-conditioner which performs air-conditioning inside a room, a motor which performs opening and closing of a window, and the like.

The processing execution module set 4 is a set of processing item execution modules 4-1, 4-2, . . . , 4-$n$ which are provided in correspondence with the various processing items prepared beforehand. The respective processing item execution modules 4-1, 4-2, . . . , 4-$n$ are modules each of which executes arithmetic and control processing corresponding to each of the various processing items.

Here, the "processing item" means an item of processing actually executed in various devices (output devices 6) in correspondence with an input event. For example, the "processing item" means processing in which in correspondence with an input event input by uttering "switch on air-conditioner", "air-conditioner is switched on" is uttered or the air conditioner is actually activated, and processing in which in correspondence with an input event input by uttering "close window", "window is closed" is uttered, or a motor for closing the window is actually activated.

There is defined a transition order relation between these processing items. For example, the transition order relation is defined in such a manner that subsequently to a processing item TTS1 for which "air-conditioner or window?" is uttered in correspondence with an input event input by uttering "lower", there is set a processing item QB1 for which it is determined whether the object is an "air-conditioner", a "window", or others (see FIG. 2). As for the respective processing items between which the transition order relation is defined, a connection for specifying an information transmission relation between the processing items is referred to as a "net". For example, in the above described example, the processing item TTS1 and the processing item QB1 are connected by the net. The net has a directionality. A net connected to the input side of a processing item is referred to as an "input net", and a net connected to the output side of the processing item is referred to as an "output net". That is, when it is assumed that a set of processing items is N, a set of the nets is E, G=(N, E) constitutes a directed graph.

Each net has two states of an active (assert) state and an inactive (negate) state, (further, the active state may be defined into two or more states, if necessary). A state of the net is referred to as a "net status". Each of processing item execution modules 4-1, 4-2, . . . , 4-n executes processing contents of the corresponding processing item, when the net status of the input net is in the active state. Then, the net status of the output net is updated according to the execution result.

The interaction recognition module 2 is a device which recognizes an input event, such as a user's utterance, input from the input devices 5, such as a microphone, and outputs the recognized result as recognition information in a predetermined form. The interaction recognition module 2 includes a recognition dictionary 7, input event recognition means 8, and recognition information input means 9. The recognition dictionary 7 stores various recognition information for recognizing utterance by the user, such as a word, a text, and a voice waveform. The input event recognition means 8 recognizes an input event input from the input device 5, while referring to the recognition dictionary 7, and outputs the recognized result as the recognition information. The recognition information input means 9 rewrites the net status table 10 as will be described below, on the basis of the recognition information output from the input event recognition means 8.

The interaction processing engine 3 includes a net status table 10, a before-status net status table 11, a processing item table 12, selection execution means 13, and status change determination means 14.

The net status table 10 stores the net statuses of the respective nets as a table. When one round of processing relating to the respective processing items is executed and the net statuses of the respective nets are updated, the before-status net status table 11 stores the net status of the respective nets before the update processing. Note that the before-status net status table 11 may be configured to store the previous net statuses of all the nets, but may also be configured to store the nets which are actually changed. Further, the before-status net status table 11 may also be combined with the net status table 10 so that the net statuses are stored as one table. When updating the net status, each of the processing item execution modules 4-1, 4-2, . . . , 4-n updates the net status in the net status table 10.

The processing item table 12 stores a set of {a processing item, an input net connected to the input side of the processing item, and an output net connected to the output side of the processing item} as a table.

The selection execution means 13 successively selects all the processing items in the processing item table 12, and reads the net status of the input net of the selected processing item from the net status table 10. Then, the selection execution means 13 inputs the read net status into the processing item execution module 4-i corresponding to the processing item, to make the processing item execution module execute processing contents of the processing item.

The status change determination means 14 makes the selection execution means 13 execute the respective processing item execution modules 4-1, 4-2, . . . , 4-n, when one of the net statuses in the net status table 10 is changed.

Figure 2:
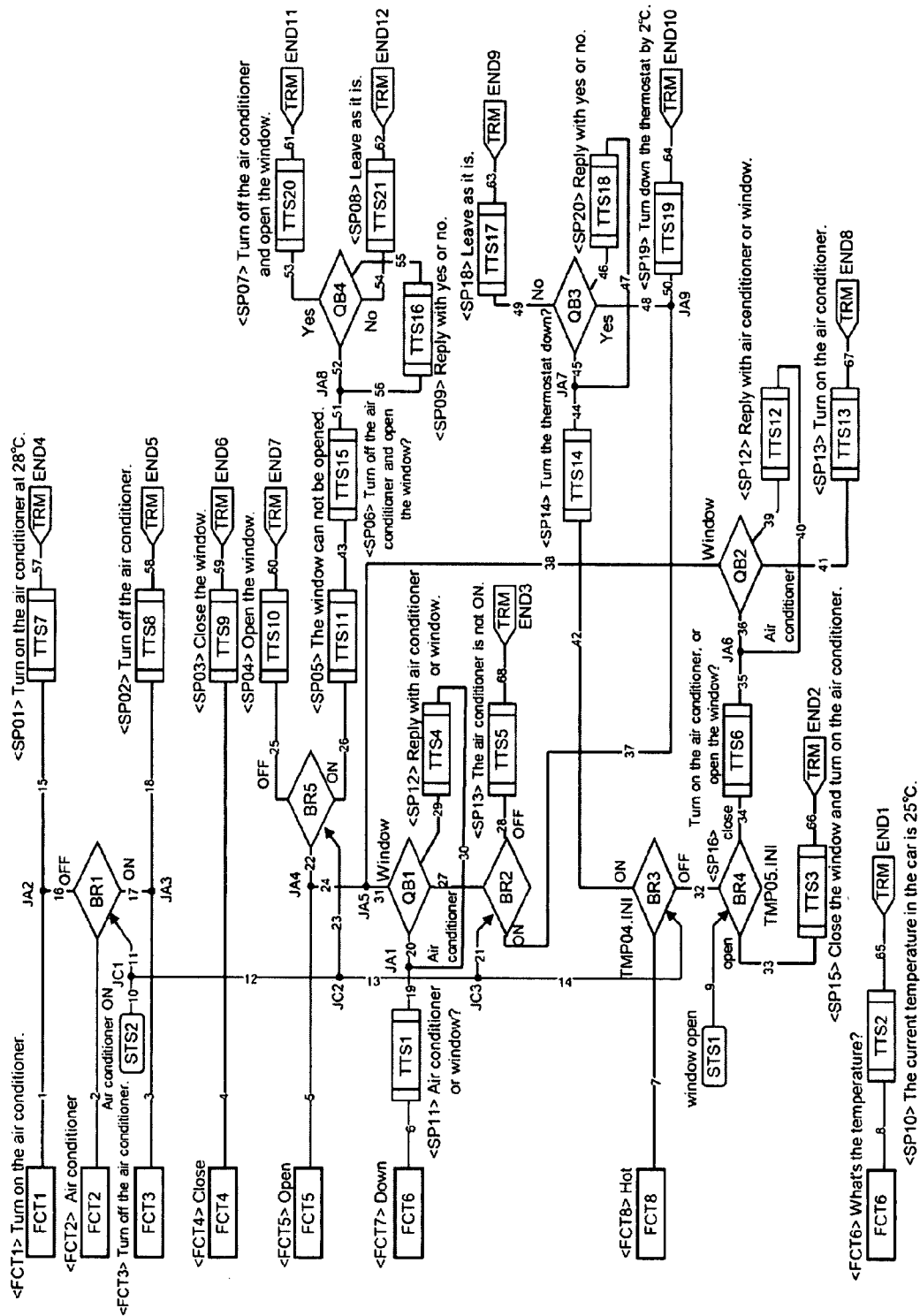
FIG. 2 is a figure showing an example of a scenario configuration in the interaction information processing apparatus 1 according to Embodiment 1.

Here, the relation between the processing item and the net in the interaction information processing apparatus 1 according to the present embodiment will be more specifically described according to an example. FIG. 2 is a figure showing an example of an interaction scenario configuration in the interaction information processing apparatus 1 according to Embodiment 1. This interaction scenario represents an example in which air conditioning in a motor vehicle is performed in an interactive mode.

In FIG. 2, processing items correspond to portions denoted by reference characters of FCT, QB, TTS, STS, BR and TRM.

The reference character "FCT" denotes an item of processing for extracting a specified keyword described in XML (Extensible Markup Language) form for voice recognition from input voice. The symbol "<FCT>" attached to each FCT denotes a corpus (keyword) for entering the FCT. Actually, the "FCT" is an item of processing executed by the interaction recognition module 2 (initial net status update means), and is treated as a keyword for entering a category of the interaction scenario.

The reference character "QB" denotes processing configured to extract voice words by utilizing the specified XML on the basis of voice recognition, and to branch the flow of interaction.

The reference character "TTS (Text to Speech)" denotes text voice synthesis processing. This corresponds to processing configured to read a text specified by the output device 6 (loudspeaker). The symbol "<SP>" attached to each TTS denotes contents of the text to be read in the TTS.

By using TTS and QB in combination with each other, it is possible to describe a question. For example, in TTS1, it is configured such that "air-conditioner or window?" is uttered. In QB1 configured to perform recognition for the question, the recognition processing of a reply to the question is realized by specifying an XML file storing imaginable reply patterns ("air-conditioner" and "window").

The reference character "STS" denotes internal status information. For example, STS1 denotes internal status information on whether or not the window is opened, and ST2 denotes internal status information on whether or not the air-conditioner is switched on.

The reference character "BR" denotes processing configured to branch the flow of interaction on the basis of the internal status information other than the voice recognition. For example, in BR1, the contents of conversation are changed according to whether the power source of the air-conditioner is switched on or not.

The reference character "TRM" denotes termination processing. That is, this interaction scenario is ended in TRM.

Lines connecting between the respective processing items (FCT, QB, TTS, STS, BR, TRM) denote the nets. A number given to each net represents a net number. In the following, a net of a net number x is described as "NETx". The reference characters "JA" and "JC" denote connection points of the nets.

For example, when a keyword "lower" is input as a first input event, a processing item FCT6 is executed by the interaction recognition module 2, so that NET6 is activated. Then, utterance processing to utter "air-conditioner or window" is performed in the processing item TTS1, so that NET 6 is deactivated and NET19 is activated. Thereby, NET 20 is activated. Then, the processing item QB1 is performed to determine whether "air-conditioner", "window", or others is input as the input event. The processing to branch the flow of interaction is performed according to the determination, so that NET19 and NET20 are deactivated and one of NET27, NET31 and NET29 is activated. In this way, the interaction processing is performed according to the interaction scenario shown in FIG. 2.

FIG. 3 is a figure showing a structure of the processing item table 12. In FIG. 3, a structure of the processing item table 12 for the interaction scenario in FIG. 2 is shown as an example.

In a column of "processing item", a pointer for calling a processing item execution module 4-*i* corresponding to each processing item in FIG. 2 is stored. Here, a connection point "JA" of the net is also dealt as one virtual processing item for which no processing is performed.

In the column of "input net", a specifier of the input net corresponding to the processing item is stored. That is, the pointer which points to the net status of the input net in the net status table 10 is stored in the column of "input net".

In the column of "output net", a specifier of the output net corresponding to the processing item is stored. That is, the pointer which points to the net status of the output net in the net status table 10 is stored in the column of "output net".

In the column of "corpus", a keyword in the processing item is stored. For example, in the processing item FCT1, "switch on air-conditioner" is stored as the corpus. Further, in the processing item QB1, "window" and "air-conditioner" are stored as the corpus.

FIG. 4 is a figure showing a structure of the net status table 10. Note that in FIG. 1, the net status table 10 and the before-status net status table 11 are separately shown in order to facilitate the understanding, but in FIG. 4, the net status table 10 and the before-status net status table 11 are combined into one table. In the column of "net status", the net status of the net in the left column is stored. Here, it is assumed that "0" denotes the inactive state and "1" denotes the active state. In the column of "change flag", a change flag which indicates whether or not the net status is changed is stored. The change flag of "0" indicates that the net status is not changed, and the change flag of "1" indicates that the net status is changed.

The operation of the interaction information processing apparatus 1 according to Embodiment 1 configured as described above will be described below.

Figure 5:
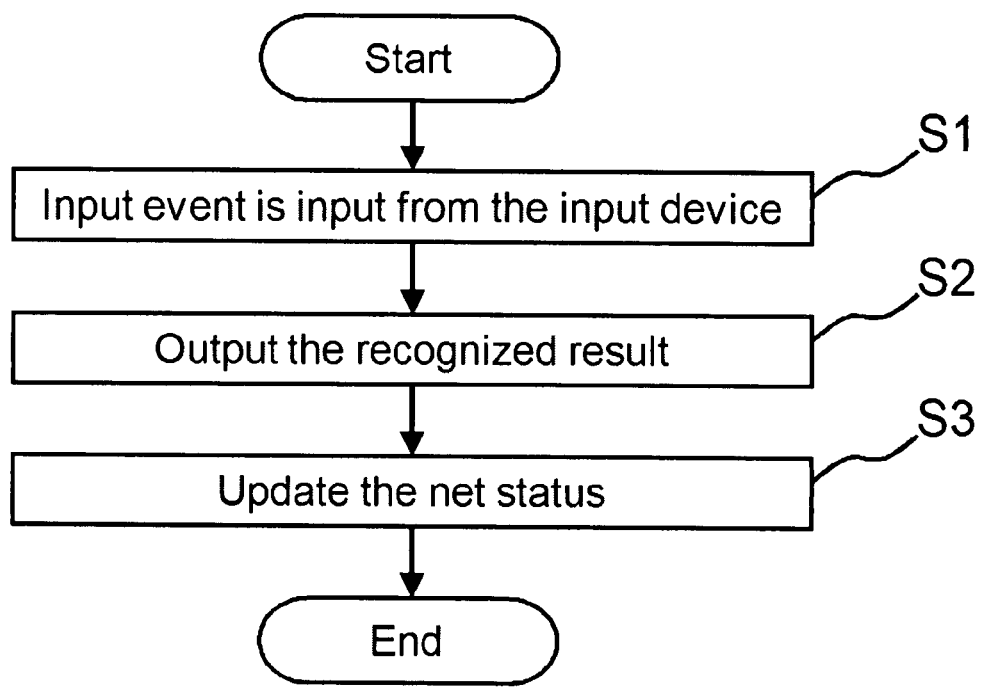
FIG. 5 is a flow chart showing an operation of an interaction recognition module 2.

FIG. 5 is a flow chart showing an operation of the interaction recognition module 2.

In step S1, an input event is input into the input event recognition means 8 from the input device 5 by a user's utterance and the like.

For example, it is assumed that "switch on air-conditioner" as the user's utterance is input into the input device 5. In this case, the input device 5 outputs a voice waveform of the user's utterance to the input event recognition means 8.

In step S2, the input event recognition means 8 recognizes the input event by referring to the recognition dictionary 7, and outputs the recognized result as the recognition information to the recognition information input means 9.

For example, when a waveform of voice uttering "switch on air-conditioner" is input as the input event in the above described example, the input event recognition means 8 analyzes the voice waveform by referring to the recognition dictionary 7, and outputs text information of "switch on air-conditioner" as the recognition information.

In step S3, the recognition information input means 9 searches a processing item FCT which has a keyword coincident with the recognition information by referring to the processing item table 12. Then, for the output net of the processing item having the coincident keyword, the recognition information input means 9 changes the net status in the net status table 10 to the active state, and sets the change flag to 1.

Further, the recognition information input means 9 searches a processing item QB which has a keyword coincident with the recognition information among processing items QB whose input net is in the active state. Then, for the output net of the branch having the coincident keyword among the output nets of the processing item QB detected by the search, the recognition information input means 9 changes the net status in the net status table 10 to the active state, and sets the change flag of the net status to 1.

For example, in the case where the text recognition information that "switch on air-conditioner" is input into the recognition information input means 9, the recognition information input means 9 sets NET1 which is the output net of the processing item FCT1 into the active state. Further, in the case where NET20 which is the input net of the processing item QB1 is in the active state and where the text recognition information of "window" is input into the recognition information input means 9, the recognition information input means 9 activates NET31 which is the output net of the branch corresponding to "window" of the processing item QB1.

When the processing in the above described steps from S1 to S3 is ended, the interaction recognition module 2 ends all the processing, and is put in the state of waiting for an input event to be input again.

Figure 6:
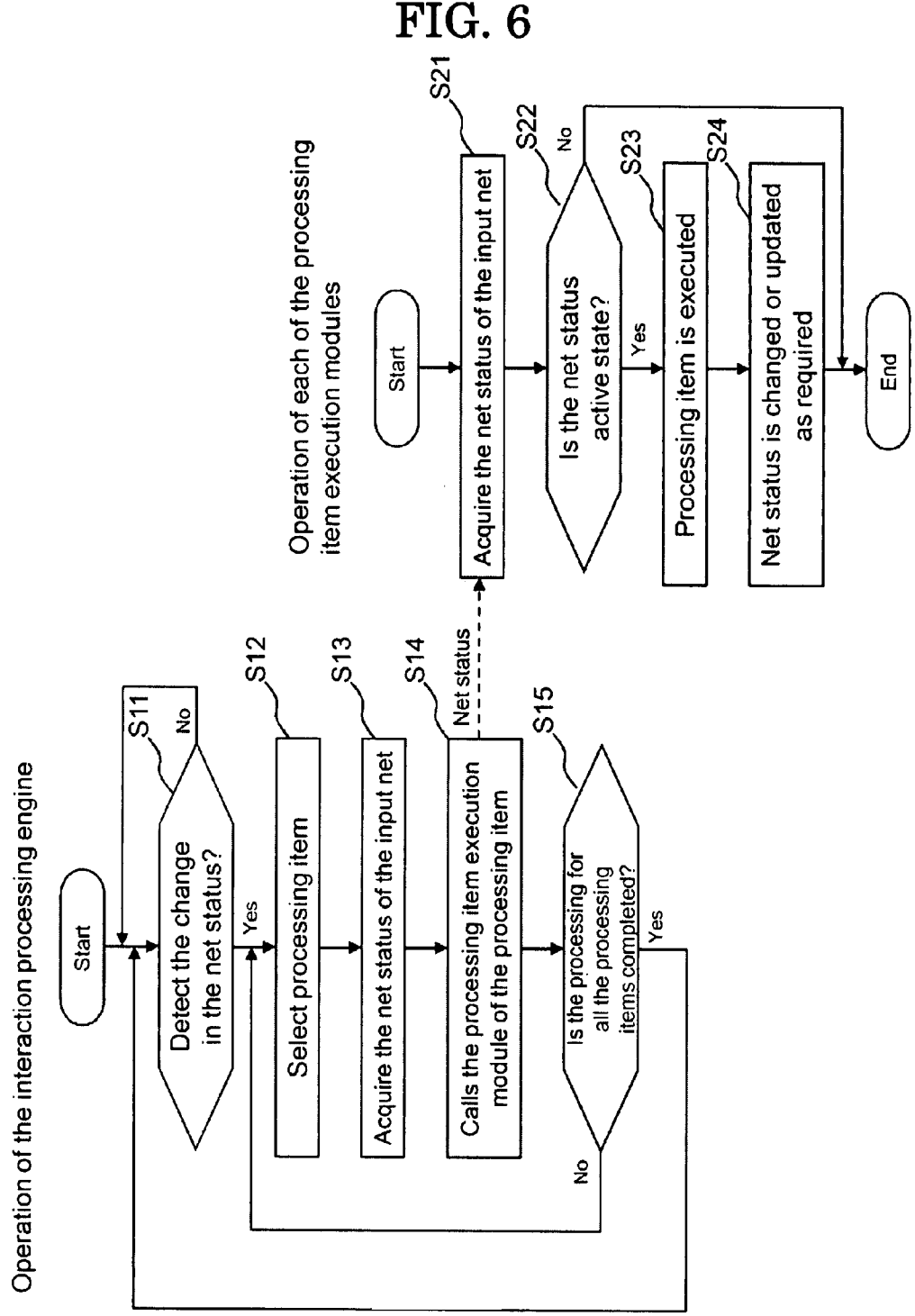
FIG. 6 is a flow chart showing an operation of an interaction processing engine 3 and each processing item execution module 4-$i$.
Figure 7:
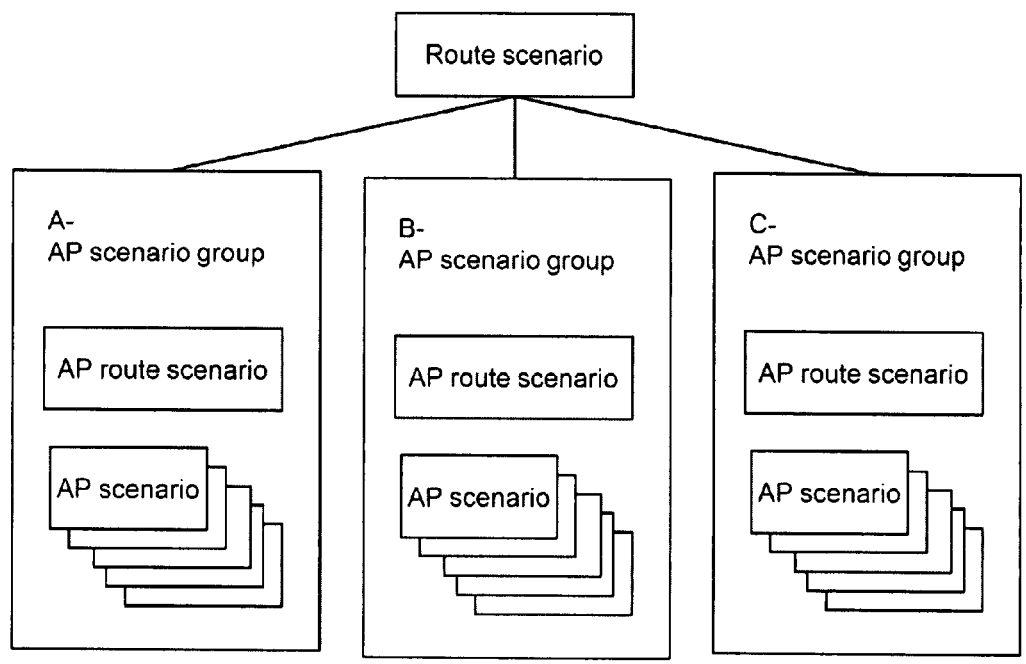
FIG. 7 is a figure showing a hierarchical configuration of scenarios in an interaction information processing apparatus described in Patent Document 2.

Next, operations of the interaction processing engine 3 and the respective processing item execution modules 4-*i* will be described. FIG. 6 is a flow chart showing operations of the interaction processing engine 3 and the respective processing item execution modules 4-*i*.

First, in step S11, the status change determination means 14 monitors whether or not the net status in the net status table 10 is changed. When the net status is changed, the process proceeds to step S12.

In step S12, the selection execution means 13 selects one processing item in the order from the top line of the processing item table 12.

In step S13, the selection execution means 13 acquires the net status of the input net corresponding to the selected processing item from the net status table 10.

In step S14, the selection execution means 13 calls the processing item execution module 4-*i* corresponding to the selected processing item, and transfers the acquired net status to the processing item execution module 4-*i*. Then, the selection execution means 13 returns the input net of the selected processing item to the inactive state. Note that when the selected processing item is a connection point (JA), the selection execution means 13 sets the output net of the connection point to the active state, and returns the input net of the connection point to the inactive state.

In each of the processing item execution modules 4-*i*, when called from the selection execution means 13, the net status of the input net is first acquired in step S21, and whether or not the net status of the input net is the active state is checked in step S22. Here, when the net status of the input net is in the inactive state, the process is ended without performing any processing.

On the other hand, when the net status of the input net is in the inactive state, the processing contents of the processing item is executed in step S23. Then, in step S24, the net status of the output net in the net status table 10 is changed to the active state, as required, and the process is ended.

For example, in the processing item BR1, processing for determining whether or not the air-conditioner is in the ON state is performed. When the air-conditioner is in the ON state, the net status of NET17 is changed to the active state. When the air-conditioner is in the OFF state, the net status of NET16 is changed to the active state. Then, the process is ended. In processing item TTS1, after the processing to utter "air-conditioner or window" is performed, the net status of the output net is set to the active state and the process is ended. In the processing item QB1, the process is in the state of waiting for an input of the input event from the user, and the process is ended without changing the net status of the output net.

In step S15, the selection execution means 13 determines whether or not the processing of the above described steps S12 to S14 are completed for all the processing items in the processing item table 12. When the processing is not completed, the selection execution means 13 returns to step S12. When all the processing is completed, the selection execution means 13 again returns to step S11.

In this way, all the processing items in the processing item table 12 are repeatedly executed until a change in the net status in the net status table 10 no longer exists. Then, when the net status reaches a steady state, the selection execution means 13 is again put into the state of waiting for an input event.

By configuring the processing as described above, even when a plurality of input events are simultaneously input, it is possible to perform the processing items corresponding to the input events. For example, when an input event to "switch on air-conditioner" and an input event to "close" are simultaneously input, NET1 and NET4 are put in the active state. The active state of NET1 is transmitted in the order of NET1→NET15→TTS7→NET57→END4. During the transmission, the processing item TTS7 is performed so that the steady state is reached. On the other hand, the active state of NET4 is transmitted in the order of NET4→TTS9→NET59→END6. During the transmission, the processing item TTS9 is performed so that the steady state is reached. As described above, the interaction information processing is controlled on the basis of the transition of the active state of the net status by using the processing item table 12 and the net status table 10, as a result of which even when a plurality of input events are simultaneously input, it is possible to suitably perform processing in response to the input events.

Further, when a new processing item is desired to be added to the interaction scenario, or a processing item is desired to be deleted from the interaction scenario, it is only necessary that after the processing item is added to the processing item table 12, the connecting relation of the net of the added/deleted part is adjusted, and the added/deleted net is added/deleted to/from the net status table 10. That is, a change in consideration of the entire configuration of the interaction scenario is not necessary, and it is necessary to change only a part of the processing item desired to be added/deleted. Therefore, it is extremely easy to add/delete a processing item to/from the interaction scenario.

The invention claimed is:

1. An interaction information processing apparatus which interactively selects each processing item corresponding to an input event from a plurality of processing items previously prepared, and executes processing contents of the selected processing item, comprising:
   a net status table which stores, as a table, a variable (hereinafter referred to as "net status") representing status information transmitted via each net which specifies an information transmission relation between the respective processing items;
   a processing item table which stores, as a table, groups of the processing item, a net (hereinafter referred to as "input net") connected to the input side of the processing item and a net (hereinafter referred to as "output net") connected to the output side of the processing item;
   a plurality of processing item execution modules provided in correspondence with the respective processing items, which execute processing contents of the processing item, and to update the net status of the output net according to the execution result;
   selection execution means for successively selecting all the processing items in the processing item table and reading the net status of the input net of the selected processing item from the net status table, and for the read processing item whose net status is in the active state, making the processing item execution module corresponding to the processing item execute the processing contents of the processing item; and
   status change determination means for detecting, after one round of processing relating to the respective processing items is executed by the selection execution means and each net status in the net status table is updated, a change in the net status, and when one of the net statuses in the net status table is changed, making the selection execution means again execute the processing relating to the respective processing items.

2. The interaction information processing apparatus according to claim 1, further comprising:
   initial net status update means for updating, when an input event is input, the net status of the net corresponding to the input event to the active state.

3. The interaction information processing apparatus according to claim 2, wherein when a plurality of input events are simultaneously input, the initial net status update means updates the net status of the net corresponding to each of the input events, respectively.

4. The interaction information processing apparatus according to claim 3, further comprising:
   an input device which generates an input event by an operation of a user,
   wherein the initial net status update means comprises:
   a recognition dictionary which stores a correspondence relation between each input event and predetermined recognition information;
   input event recognition means for outputting recognition information corresponding to the input event by referring to the recognition dictionary; and
   recognition information input means for updating the net status of the net corresponding to the recognition information output by the input event recognition means to a state specified by the recognition information.

5. The interaction information processing apparatus according to claim 4 which is implemented by a program containing steps which are executable in a computer.

6. The interaction information processing apparatus according to claim 3 which is implemented by a program containing steps which are executable in a computer.

7. The interaction information processing apparatus according to claim 2, further comprising:

an input device which generates an input event by an operation of a user, wherein the initial net status update means comprises:

a recognition dictionary which stores a correspondence relation between each input event and predetermined recognition information;

input event recognition means for outputting recognition information corresponding to the input event by referring to the recognition dictionary; and recognition information input means for updating the net status of the net corresponding to the recognition information output by the input event recognition means to a state specified by the recognition information.

8. The interaction information processing apparatus according to claim 7 which is implemented by a program containing steps which are executable in a computer.

9. The interaction information processing apparatus according to claim 2 which is implemented by a program containing steps which are executable in a computer.

10. The interaction information processing apparatus according to claim 1 which is implemented by a program containing steps which are executable in a computer.

11. An interaction information processing method for suitably selecting each processing item in correspondence with an input event and executing processing contents of the selected processing item in a system which includes:

a net status table which stores, as a table, a variable (hereinafter referred to as "net status") representing status information transmitted via each net which specifies an information transmission relation between a plurality of processing items prepared beforehand;

a processing item table which stores, as a table, groups of the processing item, a net (hereinafter referred to as "input net") connected to the input side of the processing item, and a net (hereinafter referred to as "output net") connected to the output side of the processing item; and a plurality of processing item execution modules, each provided in correspondence with the each processing item, which execute processing contents of the processing item in correspondence with a net status of the input net, and which update a net status of the output net according to the execution result, the interaction information processing method comprising:

an initial net status update step of, when an input event is input, updating the net status of the net corresponding to the input event among the respective nets in the net status table; and a processing item execution step of suitably selecting and executing the processing item execution module in correspondence with the input event, wherein the processing item execution step comprises:

a net status change detection step of detecting a change in one of the net statuses in the net status table;

a selection execution step of, when a change in one of the net statuses in the net status table is detected, successively selecting all the processing items in the processing item table, reading the net status of the input net of the selected processing item from the net status table, and making the processing item execution module corresponding to the processing item, for which the net status is in the active state, execute the processing contents of the processing item; and a status change determination step of, after one round of processing relating to the respective processing items is executed and each net status in the net status table is updated in the selection execution step, detecting a change in the net status in the net status table, and determining whether or not one of the net statuses in the net status table is changed, are repeatedly executed until a change in the net status is no longer detected.

* * * * *